US008682814B2

(12) United States Patent
DiCorpo et al.

(10) Patent No.: US 8,682,814 B2
(45) Date of Patent: Mar. 25, 2014

(54) USER INTERFACE AND WORKFLOW FOR PERFORMING MACHINE LEARNING

(75) Inventors: Phillip DiCorpo, San Francisco, CA (US); Shitalkumar S. Sawant, Fremont, CA (US); Sally Kauffman, Washington, DC (US); Alan Dale Galindez, Menlo Park, CA (US); Sumesh Jaiswal, Kalyani Nagar (IN); Ashish Aggarwal, Saharanpur (IN)

(73) Assignee: Symantec Corporation, Mountain View, CA (US)

( * ) Notice: Subject to any disclaimer, the term of this patent is extended or adjusted under 35 U.S.C. 154(b) by 384 days.

(21) Appl. No.: 13/038,299

(22) Filed: Mar. 1, 2011

(65) Prior Publication Data

US 2012/0150773 A1 Jun. 14, 2012

(51) Int. Cl.
*G06F 15/18* (2006.01)
(52) U.S. Cl.
USPC .............................. 706/12; 726/27
(58) Field of Classification Search
USPC .......................... 706/11, 14, 15, 46
See application file for complete search history.

(56) References Cited

U.S. PATENT DOCUMENTS

| 7,480,640 | B1 * | 1/2009 | Elad et al. ................... 706/14 |
| 7,484,065 | B2 * | 1/2009 | Pomaranski et al. ......... 711/170 |
| 7,499,897 | B2 * | 3/2009 | Pinto et al. ................... 706/46 |
| 8,286,253 | B1 * | 10/2012 | Lu et al. ...................... 726/26 |
| 2004/0034612 | A1 * | 2/2004 | Mathewson et al. ........ 706/46 |
| 2004/0133574 | A1 * | 7/2004 | Bradford ...................... 707/8 |
| 2007/0113292 | A1 * | 5/2007 | Kao et al. .................... 726/27 |
| 2007/0300306 | A1 * | 12/2007 | Hussain ....................... 726/27 |
| 2009/0178144 | A1 * | 7/2009 | Redlich et al. ............... 726/27 |
| 2009/0210369 | A1 * | 8/2009 | Shao et al. ................... 706/21 |
| 2009/0265778 | A1 * | 10/2009 | Wahl et al. .................. 726/13 |
| 2009/0292743 | A1 * | 11/2009 | Bigus et al. ................. 707/202 |
| 2009/0293121 | A1 * | 11/2009 | Bigus et al. ................. 726/22 |
| 2010/0024037 | A1 * | 1/2010 | Grzymala-Busse et al. .... 726/26 |
| 2010/0036779 | A1 * | 2/2010 | Sadeh-Koniecpol et al. ... 706/11 |
| 2010/0161830 | A1 * | 6/2010 | Noy et al. .................... 709/234 |
| 2010/0162347 | A1 * | 6/2010 | Barile .......................... 726/1 |
| 2012/0151551 | A1 * | 6/2012 | Readshaw et al. ............ 726/1 |

OTHER PUBLICATIONS

Seufert S. et al., "Machine Learning for Automatic Defence against Distributed Denial of Service Attacks", This full text paper was peer reviewed at the direction of IEEE Communications Society subject matter experts for publication in the ICC 2007 proceedings, 2007, pp. 1217-1222.*

Osareh A. et al., "Intrusion Detection in Computer Networks based on Machine Learning Algorithms", IJCSNS International Journal of Computer Science and Network Security, vol. 8 No. 11, Nov. 2008, pp. 15-23.*

(Continued)

*Primary Examiner* — Jeffrey A Gaffin
*Assistant Examiner* — Dave Misir
(74) *Attorney, Agent, or Firm* — Lowenstein Sandler LLP

(57) ABSTRACT

A computing device receives a training data set that includes a plurality of positive examples of sensitive data and a plurality of negative examples of sensitive data via a user interface. The computing device analyzes the training data set using machine learning to generate a machine learning-based detection (MLD) profile that can be used to classify new data as sensitive data or as non-sensitive data. The computing device displays a quality metric for the MLD profile in the user interface.

23 Claims, 12 Drawing Sheets

(56) References Cited

OTHER PUBLICATIONS

Pietraszek T. et al., "Data Mining and Machine Learning|Towards Reducing False Positives in Intrusion Detection", Appearing in Information Security Technical Report,10(3), 2005, pp. 1-17.*

Takebayashi T., et al., "Data Loss Prevention Technologies", FUJITSU Sci. Tech. J., vol. 46, No. 1, pp. 47-56, Jan. 2010.*

"White Paper: Data Loss Prevention—Machine Learning Sets New Standard for Data Loss Prevention: Describe, Fingerprint, Learn." Dec. 14, 2010, 9 pages, Symantec Corporation.

* cited by examiner

USER INTERFACE AND WORKFLOW FOR PERFORMING MACHINE LEARNING

TECHNICAL FIELD

Embodiments of the present invention relate to the field of data loss prevention, and more particularly, to a data loss prevention (DLP) system that provides an interface that enables users to generate and deploy machine learning-based detection (MLD) profiles.

BACKGROUND

Many organizations implement data loss prevention (DLP) systems to identify and control access to sensitive data. Typical DLP systems protect sensitive data through deep content inspection and analysis, which includes describing technology and fingerprinting technology. Describing technology protects sensitive data by identifying matches to keywords, expressions or patterns, and file types, and by performing other signature-based detection techniques. Fingerprinting technology protects sensitive data by identifying exact matches to whole or partial files. While effective in protecting much of an organization's sensitive data, fingerprinting and describing technologies have limitations when addressing large amounts of unstructured data and intellectual property such as product formulas, source code, and sales and marketing reports.

To more accurately protect sensitive unstructured data, some DLP systems are exploring the use of vector machine learning (VML) technology. However, VML is very complex to implement. Accordingly, current DLP systems that use VML require an expert in VML to design machine learning-based detection (MLD) profiles for customers. The DLP system that is shipped to the customer then has a predefined MLD profile that the customer is unable to modify. Such DLP systems do not provide any user interface or workflow to enable users to generate their own MLD profiles.

SUMMARY

In one embodiment, a computing device receives a training set of data that includes positive examples of sensitive data and negative examples of sensitive data via a user interface for machine learning (ML). The computing device analyzes the training set of data using machine learning to train a MLD profile that can be used to classify new data as sensitive data or as non-sensitive data. The computing device displays a quality metric for the MLD profile in the user interface. In one embodiment, the MLD profile includes a statistical data classification model and a feature set comprising statistically significant features of the positive examples and statistically significant features of the negative examples, and the quality metric includes at least one of a false positive rating, a false negative rating and a memory utilization rating. In one embodiment, the computing device identifies in the user interface at least one of data that caused false positives and data that caused false negatives from the training set of data.

In one embodiment, the computing device receives a user selection of a memory allocation via the user interface before analyzing the training set of documents, wherein the memory utilization rating for the categorization data complies with the memory utilization allocation. In one embodiment, the computing device enables a deploy operation if the false positive rating is within a false positive threshold and the false negative rating is within a false negative threshold. In response to receiving a user request to deploy the MLD profile, the computing device adds the MLD profile to a data loss prevention (DLP) policy of a DLP system.

In one embodiment, the computing device receives categorization information for the positive examples of sensitive data and for the negative examples of sensitive data. The computing device may then identify in the user interface categories of data to add to the training set of data to improve the quality metric. In one embodiment, the computing device modifies the training set of data in response to user input if the quality metric fails to meet a quality threshold. The computing device then analyzes the modified training set of data to retrain the MLD profile and displays a new quality metric for the MLD profile in the user interface.

In one embodiment, the training set of data was collected by a data loss prevention (DLP) policy of a DLP system, the plurality of negative examples of sensitive data comprising documents that were misclassified as sensitive documents by the DLP policy. In this embodiment the computing device may then deploy the MLD profile to the DLP policy.

In one embodiment, a computer readable medium includes instructions that will cause a processor that executes the instructions to receive a training data set that includes a plurality of positive examples of sensitive data and a plurality of negative examples of sensitive data via a user interface for machine learning. The processor then analyzes the training data set using machine learning to train a machine learning-based detection (MLD) profile that can be used to classify new data as sensitive data or as non-sensitive data, and displays a quality metric for the MLD profile in the user interface.

In one embodiment, a method for generating an MLD profile comprises receiving a training data set that includes a plurality of positive examples of sensitive data and a plurality of negative examples of sensitive data via a user interface for machine learning, analyzing the training data set using machine learning to train a machine learning-based detection (MLD) profile that can be used to classify new data as sensitive data or as non-sensitive data, and displaying a quality metric for the MLD profile in the user interface.

BRIEF DESCRIPTION OF THE DRAWINGS

The present invention will be understood more fully from the detailed description given below and from the accompanying drawings of various embodiments of the invention.

DETAILED DESCRIPTION

Figure 1:
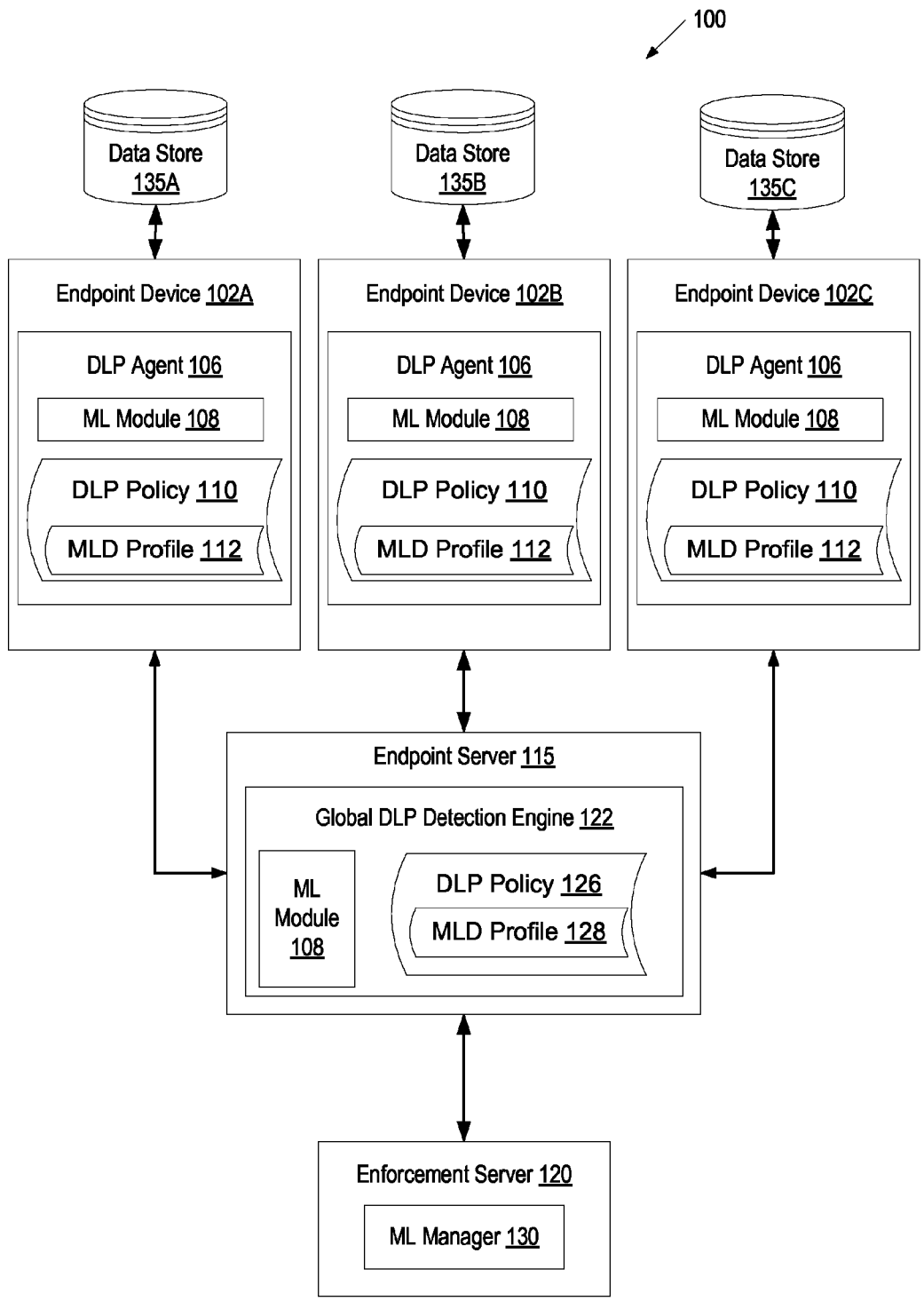
FIG. 1 illustrates an exemplary system architecture, in accordance with one embodiment of the present invention.

A system and method for generating, deploying and managing machine learning-based detection (MLD) profiles for a data loss prevention (DLP) system are described. In embodiments of the present invention, the system and method provide a user interface and workflow that enables users who are not vector machine learning experts to generate MLD profiles. This decreases the expense of deploying MLD profiles for DLP, and improves configurability of MLD profiles. Additionally, this enables MLD profiles to continually be improved by a DLP administrator.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention. For example, the following description provides details for using MLD profiles in an endpoint DLP system. However, it would be clear to one of ordinary skill in the art that embodiments of the present invention also apply to network DLP systems and to discover DLP systems (DLP systems that scan storage devices to identify and/or classify sensitive data). For example, in embodiments of the present invention, MLD profiles may be generated for detecting sensitive data that moves through an enterprise network.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "analyzing", "displaying", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 illustrates an exemplary system architecture 100, in accordance with one embodiment of the present invention. The system architecture 100 includes multiple endpoint devices 102A-102C networked to an endpoint server 115, which in turn is networked to an enforcement server 120.

Each of the endpoint devices may be a personal computer (PC), a laptop, a mobile phone, a tablet computer, or any other computing device that can be accessed by a user. Each endpoint device 102A-102C has multiple different data loss vectors. Each data loss vector is a path through which data can be transferred off of the endpoint device. Examples of data loss vectors include burning files to an optical disc, copying data to a portable drive (e.g., a portable universal serial bus (USB) drive), printing data to a printer, sending data through a fax, sending an email, sending an instant message, performing a print screen operation, etc.

The endpoint devices 102A-102C each run an operating system (OS) that manages hardware and software of the endpoint devices. The OS may be, for example, Microsoft® Windows®, Linux®, Symbian®, Apple's® OS X®, Solaris®, etc. One or more applications run on top of the OS and perform various operations that involve accessing, moving, or otherwise manipulating data residing in a data store included in, attached directly to, or networked with the endpoint device. For example, the applications may include a CD or DVD burning application, an email application, a web browser, an instant messaging application, a printing application, a print screen function, etc. In one embodiment, the applications perform the operations in response to receiving user instructions.

Each endpoint device 102A-102C may be connected to a data store 135A-135C, which may be a hard disk drive, tape backup, optical drive, volatile memory (e.g., random access memory (RAM)), or other storage device. Data stores 135A-135C may be internal to endpoint devices 102A-102C or external to endpoint devices 102A-102C. In one embodiment, the data stores 135A-135C may be combined into a network storage such as a storage area network (SAN) or network attached storage (NAS). In one embodiment, data stores 135A-135C may be combined into a network database such as a relational database. Data stores 135A-135C may contain data that includes sensitive information. The data may include files (e.g., documents), tables, or other data formats. Examples of sensitive information include source code, patient health information, insurance claims, product formulas, legal documents, merger and acquisition documents, sales and marketing reports, social security numbers, credit card numbers, etc.

Each endpoint device 102A-102C includes a DLP agent 106 that monitors data loss vectors to ensure that sensitive (e.g., confidential) information does not leave the endpoint device for illegitimate purposes. The DLP agent 106 may scan data as it moves through a data loss vector and/or when a request to send the data through a data loss vector is received. When DLP agent 106 detects data moving through a data loss vector or a request to move the data through the data loss vector, the DLP agent 106 implements a DLP policy 110 to determine whether the data is sensitive data (includes sensitive information). The DLP policy 110 may specify a type of content to be monitored (e.g., messages, displayed data, stored documents, etc.), how to identify sensitive data, and/or an action to be performed when sensitive data is detected. In one embodiment, the DLP policy 110 includes a MLD profile 112. The DLP agent 106 includes a machine learning (ML) module 108 that processes the data using the MLD profile 112. By processing the data using the MLD profile 112, the ML module 108 determines whether the data is sensitive data.

For some types of DLP detection techniques, DLP agent 106 sends data to endpoint server 115, and a global DLP detection engine 122 included in the endpoint server 115 determines whether the data includes sensitive information. Once global DLP detection engine 122 determines whether a file or other data contains sensitive information, endpoint server 115 sends a message back to the DLP agent 106 stating whether or not the data is sensitive data. The DLP agent 106 may then perform one or more actions to enforce a DLP policy 110 if the data does contain confidential information. In one embodiment, global DLP detection engine 122 includes a ML module 108 and a DLP policy 126 that includes a MLD profile 128. The DLP policy 128 and MLD profile 128 may be different from DLP policy 110 and MLD profile 112.

In one embodiment, endpoint server 115 acts as an aggregator of data regarding violations of DLP policies (e.g., as an aggregator of incident reports). The endpoint server 115 may collect such data from each endpoint device 102A-102C, and report the collected data to enforcement server 120 for analysis.

Enforcement sever 120 manages DLP policies. This may include generating and modifying DLP policies (e.g., based on administrator input). The enforcement server 120 may then propagate the DLP policies to the endpoint server 115 and/or to the endpoint devices 102. Additionally, the enforcement server 120 may generate DLP response rules, which it may also propagate to the endpoint server 115 and/or to the endpoint devices 102. The DLP response rules designate actions for endpoint devices 102 and/or the endpoint server 115 to take when DLP policies are violated. Examples of actions that an endpoint device may take include sending a notification to an administrator, preventing the data from exiting the endpoint device 102A-102C through the data loss vector, locking down the endpoint device so that no data can be moved off of the endpoint device through any data loss vector, encrypting data as it is moved off the endpoint device, and so on.

In one embodiment, enforcement server 120 includes a machine learning (ML) manager 130. ML manager 130 provides a user interface and a workflow for users to generate and deploy MLD profiles. The ML manager 130 is described in greater detail below with reference to FIG. 3.

Figure 2:
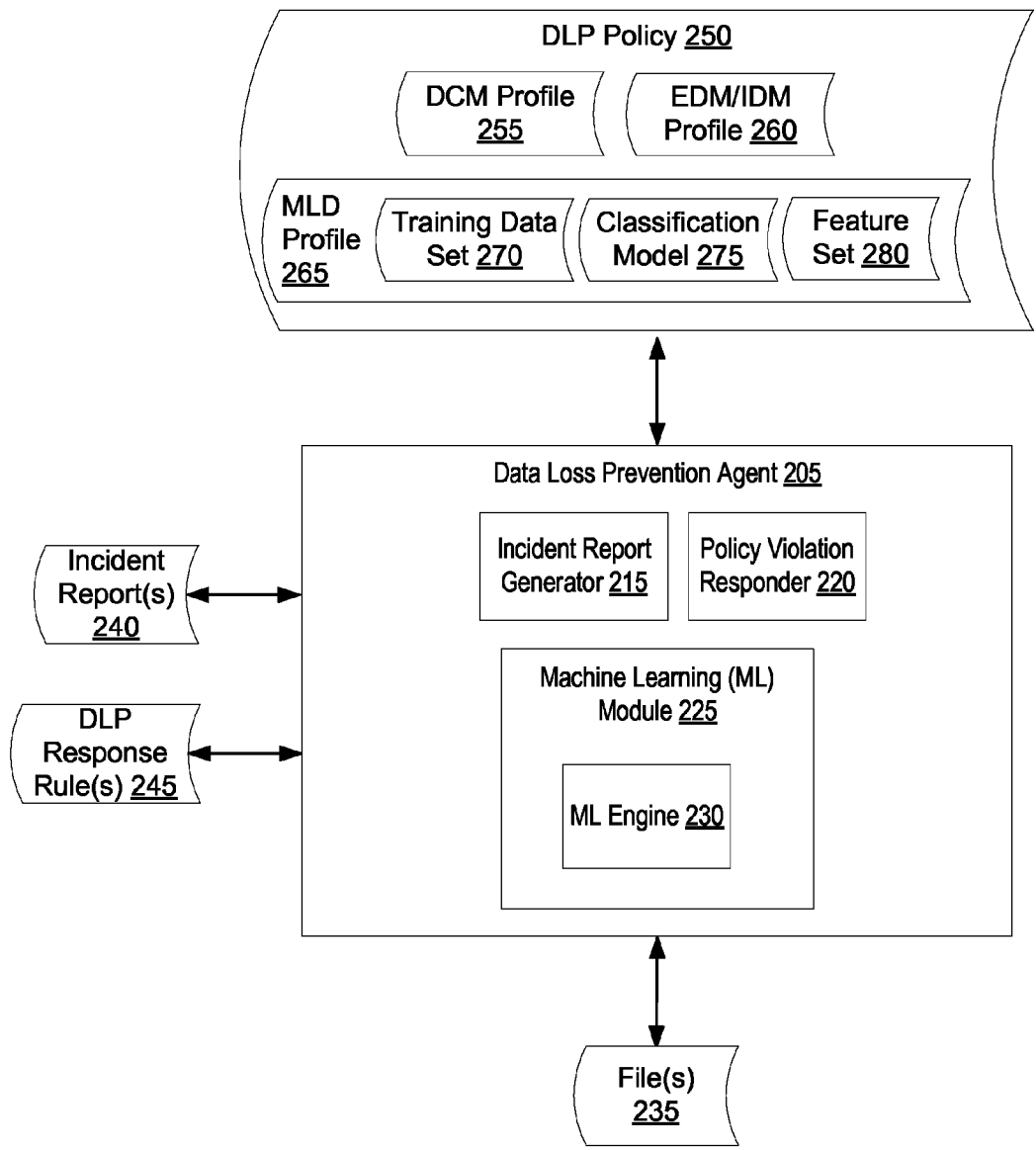
FIG. 2 is a block diagram of a data loss prevention agent, in accordance with one embodiment of the present invention.

FIG. 2 is a block diagram of a data loss prevention agent 205, in accordance with one embodiment of the present invention. The DLP agent 205 may monitor different data loss vectors, applications, data, etc. to detect operations that attempt to move data off of an endpoint device. The user initiated operations may include, for example saving or accessing restricted database data on any storage device of the endpoint device, using restricted database data in an application, printing confidential data, using confidential data in a network communication protocol, etc.

The DLP agent 205 may include one or more policy violation detectors, each of which may process different DLP policies 250 and/or different profiles 255, 260, 265 within a DLP policy 250 to identify and secure sensitive data. DLP policy 250 may include criteria that may indicate an increased risk of data loss. DLP policy 250 is violated if one or more criteria included in the DLP policy 250 are satisfied. Examples of criteria include user status (e.g., whether the user has access privileges to a file), file location (e.g., whether a file to be copied is stored in a confidential database), file contents (e.g., whether a file includes sensitive information), time (e.g., whether an operation is requested during normal business hours), data loss vector, application attempting the operation, and so on.

The DLP policy 250 may include one or more profiles 255, 260, 265. Each profile may be used to identify sensitive data. In one embodiment, the DLP policy 250 includes a described content matching (DCM) profile 255. DCM profile 255 defines one or more key words and/or regular expressions to be searched for. For example, DCM profile 255 may define a social security number using a regular expression. Using DCM profile 255, DLP agent 205 determines whether any information included in scanned data match the key words and/or regular expressions. If a match is found, then it may be determined that the data includes sensitive information.

In one embodiment, the DLP policy 250 includes an exact data matching (EDM) profile and/or a indexed document matching (IDM) profile 260. Exact data matching (EDM) may be used for protecting data that is typically in structured formats, such as database records. Indexed document matching (IDM) may be used to protect unstructured data, such as Microsoft® Word or PowerPoint® documents, or CAD drawings. For both EDM and IDM, sensitive data is first identified by an organization that wishes to protect the data and then fingerprinted for precise, ongoing detection. In one embodiment, the fingerprinting process includes accessing and extracting text and data, normalizing it, and securing it using a nonreversible hash. When a file or other data is to be scanned, a fingerprint (e.g., hash) is generated of that file or contents of that file and compared to stored fingerprints. If a match is found, then the scanned file is identified as a containing sensitive data.

In one embodiment, the DLP policy 250 includes a machine learning-learning based detection (MLD) profile 265. Vector machine learning and other types of machine learning can be used to protect unstructured data, such as Microsoft® Word or PowerPoint® documents, or CAD drawings. The MLD profile 265 may include a training data set 270, a classification model 275 and a feature set 280. The training data set 270 is a collection of positive examples of sensitive data and negative examples of sensitive data. The training data set 270 is processed by a ML manager to generate the classification model 275 and the feature set 280. The classification model 275 is a statistical model for data classification that includes a map of support vectors that represent boundary features. The feature set 280 is a data structure such as a list or table that includes multiple features extracted from the training data set 270. In one embodiment, each of the features is a word included in the data from the training data set 270.

One example of a policy violation detector is a machine learning module 225. The ML module 225 includes a ML engine 230 that takes as inputs a MLD profile 265 and unclassified data (e.g., a file 235), and outputs a classification for the data. The ML engine 230 processes the input data using the classification model 275 and the feature set 280. Therefore, the ML module 225 can use the MLD profile 265 to distinguish between sensitive data and non-sensitive data.

Policy violation responder 220 applies one or more DLP response rules 245 when a DLP policy violation is detected. Each DLP response rule 245 may be associated with one or more DLP policies 250. Each DLP response rule 245 includes one or more actions for policy violation responder 220 to take in response to violation of an associated DLP policy 250. Once a violation of a DLP policy 250 is discovered, policy violation responder 220 may determine which DLP response rules are associated with the violated DLP policy 250. One or more actions included in the response rule 245 can then be performed. Examples of performed actions include sending a notification to an administrator, preventing the data from exiting an endpoint device through a data loss vector, locking down the computer so that no data can be moved off of the endpoint device through any data loss vector, encrypting data as it is moved off the endpoint device, and so on.

Incident report generator 215 may generate an incident report 240 noting the violated DLP policy 250 and the circumstances surrounding the violated DLP policy 250. Incident report generator 215 maintains a record of incident reports 240 of some or all policy violations that have occurred on an endpoint device and/or that have been attempted by a particular user. The user may be identified, for example, based on a user login. In addition to identifying the DLP policy that was violated, each incident report 240 may also indicate the circumstances of the policy violation. For example, the incident report 240 may identify an application, user, data loss vector, type of sensitive data (e.g., social security number, credit card number, etc.), etc. associated with the policy violation. The incident report generator 215 may also include a time stamp showing when the policy violation occurred.

Figure 3:
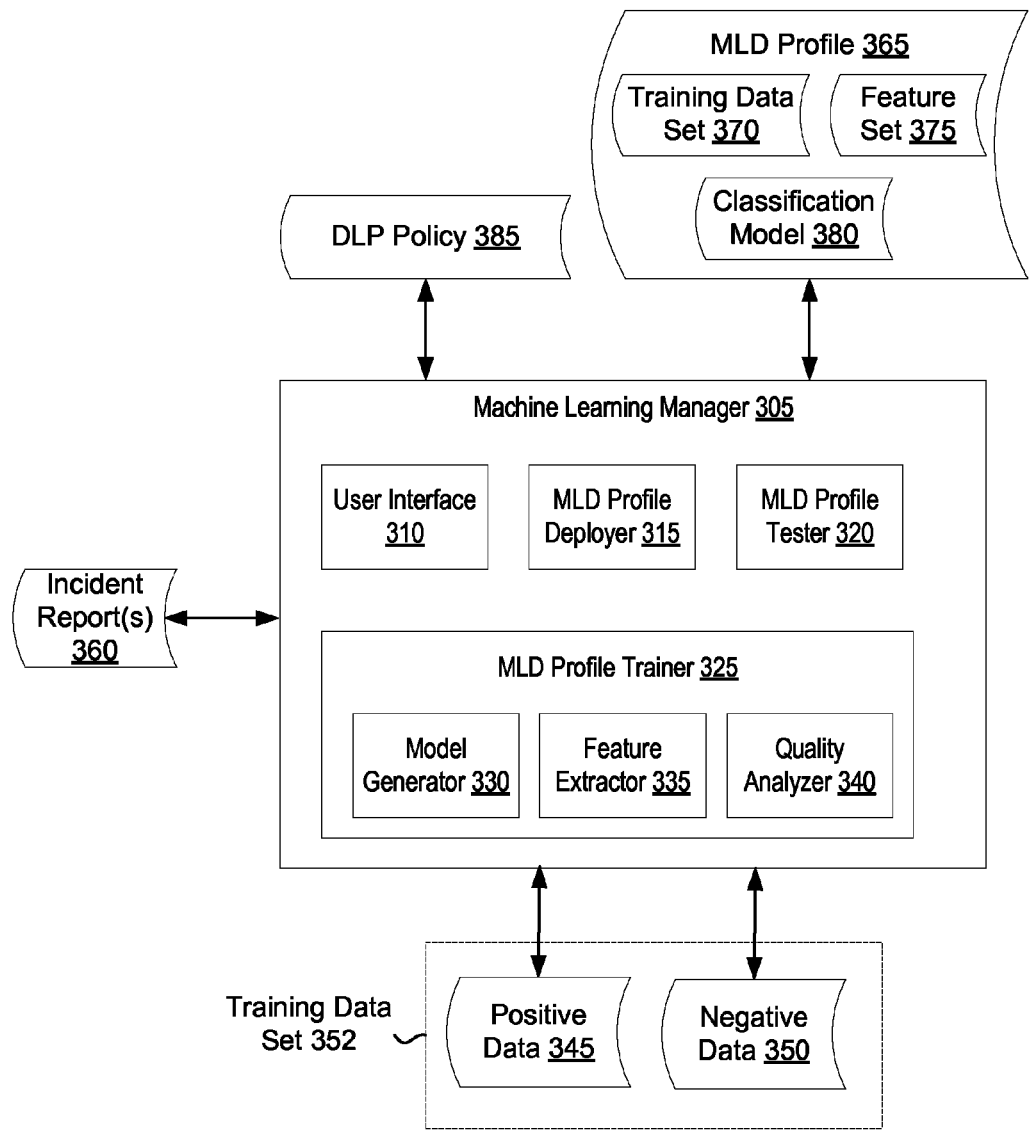
FIG. 3 is a block diagram of a machine learning manager, in accordance with one embodiment of the present invention.

FIG. 3 is a block diagram of a machine learning (ML) manager 305, in accordance with one embodiment of the present invention. The ML manager 305 includes a MLD profile trainer 325, a MLD profile tester 320 and a MLD profile deployer 315. In one embodiment, ML manager 305 also includes a user interface 310. Note that in alternative embodiments, one or more of the MLD profile trainer 325, MLD profile tester 320, or MLR profile trainer 325 may be combined into a single module or divided into multiple modules.

MLD profile trainer 325 trains a MLD profile 365 based on a training data set 352. MLD profile training is a process in which contents are extracted from a training data set and statistical analysis is performed on the contents to generate a classification model and a feature set, both of which are described in greater detail below. A user (e.g., a DLP administrator) may specify the data to use in the training data set. In one embodiment, the user selects positive examples of sensitive data (positive data 345) and negative examples of sensitive data (negative data 350), and adds them to the training data set 352. This may be done via the user interface 310. Alternatively, the user may add files to a positive data folder and to a negative data folder via a standard file system interface (e.g., Microsoft® Explorer®). Data may be added to the training data set as discreet files (e.g., documents) or as components of a single compressed file (e.g., a zip file).

In one embodiment, data for the training data set 352 is extracted from incident reports 360. The incident reports 360 may have been generated for an existing DLP policy during enforcement of the DLP policy 385. Incident reports 360 may identify instances in which an operation was performed or requested to be performed on sensitive data. The incident reports may include genuine instances of sensitive data, and may also include false positives, in which non-sensitive data was classified as sensitive data. Other historical data, which may or may not be associated with incident reports, may also be used for the training data set. The historical data may include genuine instances of sensitive data, false positives, genuine instances of non-sensitive data and/or false negatives.

In one embodiment, MLD profile trainer 325 performs incremental training for an existing MLD profile. With incremental training, MLD profile trainer 325 adds new positive data and/or negative data to the training data set based on incident reports that have been generated since the MLD profile was last trained. MLD profile trainer 325 may perform incremental training automatically or in response to user input. In one embodiment, incremental training is performed according to a predetermined schedule. For example, MLD profile trainer 325 may perform training on the MLD profile on a periodic basis, such as daily, weekly, monthly, etc.

In one embodiment, the MLD profile trainer 325 will not generate a MLD profile 325 for a training data set 352 until a threshold number of documents have been added to the training data set. In one embodiment, a threshold amount of positive data 345 and a threshold amount of negative data 350 should be added. The threshold may be, for example, 50 positive documents and 50 negative documents. In one embodiment, a maximum document size (e.g., 15 MB, 30 MB, etc.) is enforced by the ML manager 305. Any documents larger than the maximum document size may be rejected for use as training data. The maximum document size may be user selectable.

In one embodiment, the MLD profile trainer 325 includes a model generator 330, a feature extractor 335 and a quality analyzer 340. The feature extractor 335 analyzes the positive examples of sensitive data and the negative examples of sensitive data in the training data set 352, and determines the frequency of occurrence of features (e.g., words) in the positive data and in the negative data. The feature extractor 335 then ranks positive features and negative features based on, for example, frequency of occurrence. In one embodiment, the feature extractor 335 filters out common word such as "the," "it," "and," etc. The feature extractor 335 then selects the highest ranked features for a feature set 375.

In one embodiment, feature extractor 335 generates features from characters for character based alphabets such as Chinese characters (Kanji). Feature extractor 335 generates a feature for each character, and additionally creates a feature for each pair of adjacent characters. For example, for the characters Ξλ, the feature extractor would generate features for Ξ, λ and Ξλ.

The number of features added to the feature set 375 may be based on a memory allocation, which may be automatically selected by the MLD profile trainer 325 or may be chosen by a user. As the memory allocation increases, the number of features included in the feature set 375 also increases, which may increase accuracy of the MLD profile. Memory allocation may vary, for example, between about 30 MB and about 100 MB. In one embodiment, memory allocation is selectable as high, medium or low. Alternatively, specific memory allocations may be selected (e.g., 43 MB). Size of a resultant MLD profile 365 is proportional to a number of training documents and the memory allocation setting. In one embodiment, a lower memory allocation is used for a MLD profile 365 that will be implemented by a DLP agent, and a higher memory allocation is used for a MLD profile 365 that will be implemented by a global DLP detection engine.

In one embodiment, feature extractor 335 uses a term frequency-inverse document frequency (TF-IDF) algorithm to select the feature set 375. Alternatively, feature extractor 335 may use other feature extraction algorithms, such as segment-set term frequency-inverse segment-set frequency (STF-ISSF), segment-set term frequency-inverse document frequency (STF-IDF), etc. In one embodiment, the feature selection algorithm that feature extractor 335 uses is user selectable. Additionally, feature extractor 335 may perform feature extraction multiple times, each time using a different feature extraction algorithm. The feature sets generated using the different algorithms may each be used to generate different classification models, and may be tested by quality analyzer 340. The feature set that has the best quality metrics may then be saved and the others may be discarded.

After the feature extractor 335 has generated the feature set 375, model generator 330 generates a classification model 380 based on the feature set 375 and on the training data set 352. The classification model 380 is a statistical model for data classification that includes a map of support vectors that represent boundary features. The boundary features may be selected from the feature set 375, and may represent the highest ranked features in the feature set 375.

Once the feature extractor 335 generates the feature set 375 and the model generator 330 generates the classification model 380, a MLD profile 365 is complete. The MLD profile 365 may include the feature set 375, the classification model 380 and/or the training data set 370. The MLD profile 365 may also include user defined settings. In one embodiment, the user defined settings include a sensitivity threshold (also referred to as a confidence level threshold). The sensitivity threshold may be set to, for example, 75%, 90%, etc. When an ML engine uses the MLD profile 365 to classify a document as sensitive or not sensitive, the ML engine may assign a confidence value to the classification. If the confidence value for the document is 100%, then it is more likely that the decision that the document is sensitive (or not sensitive) is accurate than if the confidence value is 50%, for example. If the confidence value is less than the sensitivity threshold, then an incident may not be generated even though a document was classified as a sensitive document. This feature can help a user to further control and reduce false positives and/or false negatives. If an ML engine is trying to classify a document of a type that the training has never seen, it has a very low confidence of the document being positive and/or negative. The sensitivity threshold can be used to reduce occurrences of false positive in such cases. In one embodiment, the MLD profile trainer 325 automatically selects a sensitivity threshold for the MLD profile 365 based on the training.

In one embodiment, quality analyzer 340 analyzes a quality of the MLD profile 365 and generates one or more quality metrics for the MLD profile 365. The quality metrics may include a false positives rating (negative examples of sensitive data that were misclassified by the MLD profile 365 as sensitive data), a false negatives rating (positive examples of sensitive data that were misclassified by the MLD profile 365 as non-sensitive data), and/or a memory utilization rating (amount of memory used by the MLD profile 365). The quality analyzer 340 may compare the quality metrics to one or more quality thresholds. These may include a false positive threshold, a false negative threshold and/or a memory utilization threshold. In one embodiment, the false positive threshold is 5% and the false negative threshold is 5%. Alternatively, other false positive and/or false negative thresholds may be used. If the false positives rating exceeds the false positive threshold, the false negatives rating exceeds the false negatives threshold, or the memory utilization rating exceeds the memory utilization threshold, then the MLD profile 365 may not be ready for deployment. ML manager 305 may not permit the MLD profile 365 to be deployed if one or more of the quality thresholds have been exceeded by the MLD profile 365.

The MLD profile 365 may be modified by changing the training data set 352 and re-computing the feature set 375 and the classification model 380. The training data set 352 may be modified by adding new positive data 345, adding new negative data 350, removing instances of positive data 345, and/or removing instances of negative data 350. In one embodiment, quality analyzer 340 identifies particular files, documents, etc. from the negative data 350 that caused false positives and identifies particular files, documents, etc. from the positive data 345 that caused false negatives. A user may review this information to determine additional data to add to the training data set. Certain categories of documents may have been underrepresented in the training data set 352. For example, the user may wish to protect source code, and product documentation may have been cross classified as source code by the MLD profile 365. The user may correct this by adding additional examples of product documentation to the negative data set. Examples of categories of data that may be recognized and classified as sensitive or non-sensitive include source code, recipes, legal documents, product documentation, medical history documents, insurance documents, product formulas, patient health information, and so on.

In one embodiment, a user is able to specify a category for each file (e.g., document) that the user adds to the training data set. The quality analyzer 340 can then identify categories of documents that caused the most false positives and/or the most false negatives. In one embodiment, quality analyzer 340 suggests specific categories of documents for the user to add to improve the quality of the MLD profile 365.

In one embodiment, the ML manager 305 maintains a change report that includes changes made to a previously generated MLD profile. The change report may also include differences in quality metrics between the previously generated MLD profile and a recently modified MLD profile. The change report may be displayed to a user to enable the user to accept the changes or roll back the changes to revert to the previous MLD profile.

Once a MLD profile 365 is ready for deployment (e.g., the quality metrics are within the quality thresholds), MLD profile deployer 315 deploys the MLD profile 315. In one embodiment, MLD profile deployer 315 adds the MLD profile to an existing DLP policy 385. Alternatively, the MLD profile deployer 315 may generate a new DLP policy and add the MLD profile 365 to the new DLP policy 385.

In one embodiment, ML manager 305 includes a VML tester 320. VML tester tests the MLD profile against additional data. In one embodiment, the MLD profile tester performs negative testing on a predetermined set of testing data. The predetermined set of testing data may include a large amount of data (e.g., 10,000 documents) known to not include any sensitive information. The MLD profile tester 320 may also test the MLD profile on user selected data, which may include additional positive data and/or negative data.

Figure 4:
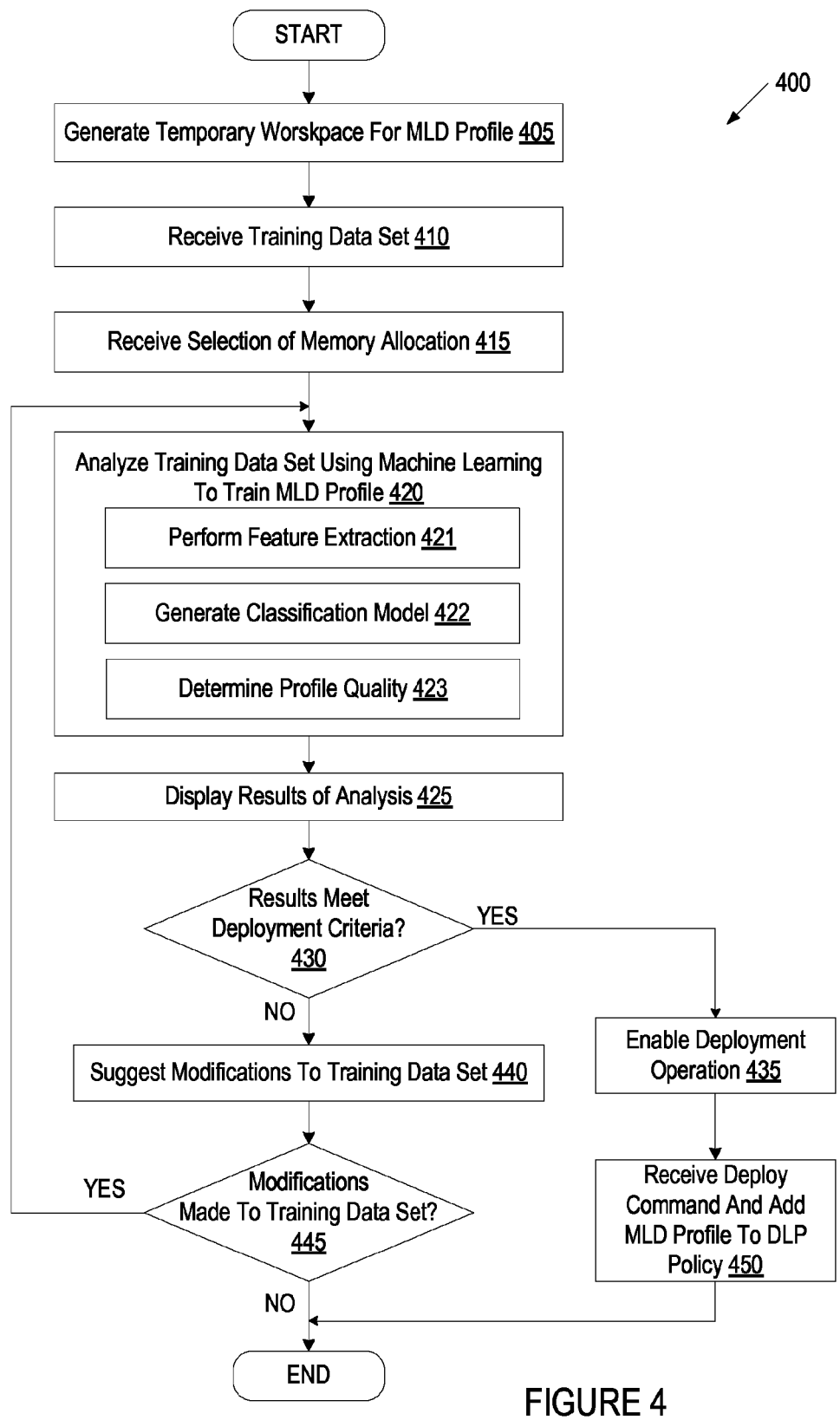
FIG. 4 is a flow diagram illustrating one embodiment for a method of generating and deploying a MLD profile.

FIG. 4 is a flow diagram illustrating one embodiment for a method 400 of generating and deploying a MLD profile. The method 400 is performed by processing logic that may comprise hardware (circuitry, dedicated logic, etc.), software (such as is run on a general purpose computer system or a dedicated machine), or a combination of both. Method 400 may be performed by a ML manager such as ML manager 130 running on enforcement server 120 of FIG. 1. Though method 400 is described below as being performed by an ML manager, method 400 may also be performed by other processing logic.

Referring to FIG. 4, at block 405 a ML manager generates a temporary workspace for a new MLD profile or an existing MLD profile that is to be modified. In one embodiment, an empty MLD profile is generated for an existing DLP policy, which may already have other profiles such as IDM or EDM profiles running. In another embodiment, an empty MLD profile is generated for a new DLP policy that has yet to be deployed. Alternatively, an existing MLD profile is opened in the temporary workspace. In one embodiment, the temporary workspace is generated in response to a user requesting to create a new MLD profile or modify an existing MLD profile via a user interface for machine learning.

In one embodiment, the new MLD profile is for protecting a specific category of data. For example, the MLD profile may be for protecting source code, for protecting patient information, for protecting sales data, etc.

Figure 5:
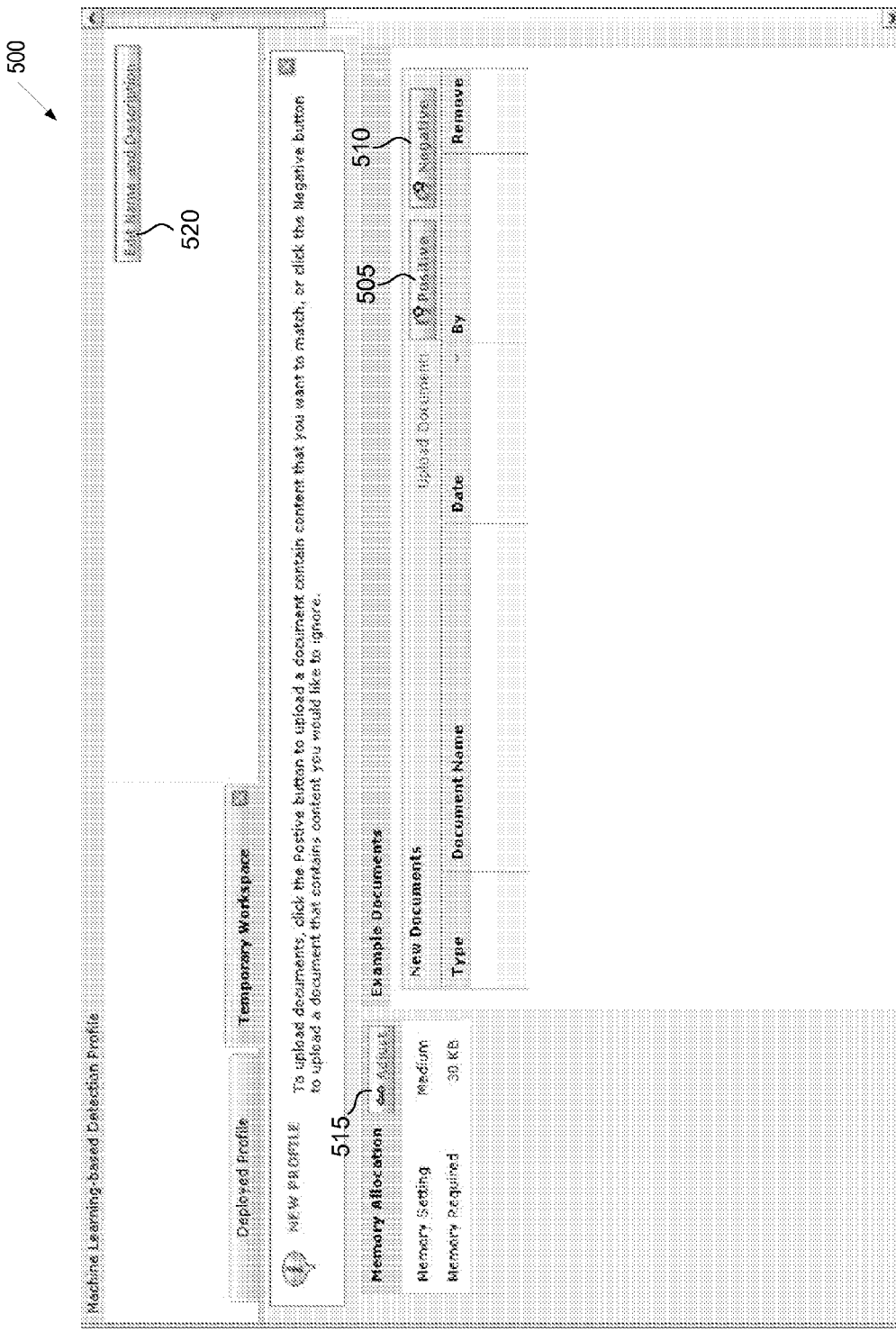
FIGS. 5-8 illustrate various views of a user interface for generating and deploying MLD profiles, in accordance with embodiments of the present invention.

FIG. 5 illustrates a first view 500 of a user interface for machine learning showing an empty temporary workspace, in accordance with one embodiment of the present invention. As shown, the temporary workspace includes a "positive" button 505 for uploading positive documents and a "negative" button 510 for uploading negative documents. In response to a user selecting the "positive" button 505 or the "negative" button 510, a ML manager may open a file browser window. A user may then navigate the file browser window to select a document or documents for uploading.

In one embodiment, the user interface includes a memory allocation button 515. In response to a user selecting the memory allocation button 515, the ML manager opens a window that presents the user with options for memory allocation. In one embodiment, the user is able to select between a high, medium and low memory allocation. Each memory allocation may be associated with a specific memory utilization threshold. Alternatively, the user may be able to select a specific memory allocation (e.g., 12 MB, 54 MB, etc.). In one embodiment, the user interface includes an additional button 520 that, when selected, opens a window in which a user can type in a profile name and/or a profile description.

Returning to FIG. 4, at block 410 of method 400 the ML manager receives a training data set. In one embodiment, a user selects data for the training data set via the user interface. The training data set includes both positive examples of sensitive data and negative examples of sensitive data. The training data set may include multiple documents. In one embodiment, a user specifies a category (e.g., source code, sales data, medical records, etc.) for each document. In one embodiment, the ML manager checks a document size for each document in the training data set. The ML manager may reject those ML documents that exceed a maximum document size.

Figure 6:
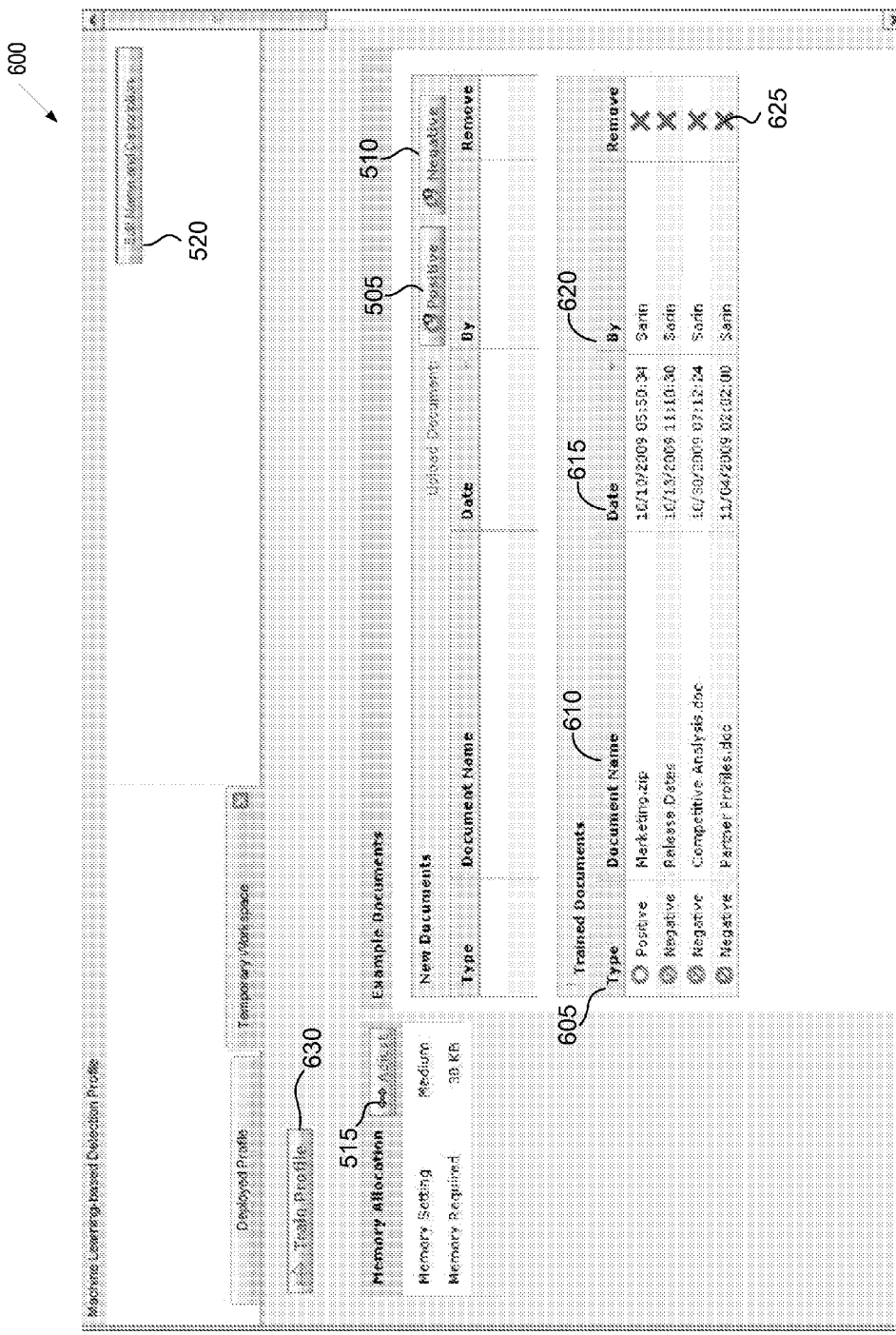

FIG. 6 illustrates a second view 600 of the user interface of FIG. 5 showing a training data set, in accordance with one embodiment of the present invention. Each document in the training data set may be displayed along with multiple attributes of the document. In one embodiment, displayed document attributes include a document type 605 (i.e., whether the document is a positive document or a negative document), a document name 610, a document date 615 (i.e., date that the document was uploaded), and a document author 620. Each document may also include a remove button 625. By selecting a remove button 625, a user may remove a particular document from the training data set. In one embodiment, a document category is also shown. A user may assign a document category for each document. In one embodiment, clicking a cross button present on a temporary workspace tab rolls back all changes that have been made to the profile. The profile then continues to remain in a last known functional state.

Once a threshold number of positive documents and negative documents have been added to the training data set (e.g., 20 documents of each type, 50 documents of each type, etc.), a train profile operation becomes available. In one embodiment, a "train profile" button 630 becomes active when the threshold number of positive documents and negative documents have been added. A user may select the "train profile" button 630 to train the MLD profile (e.g., to generate a feature set and a classification model for the MLD profile).

Returning to FIG. 4, at block 415 of method 400 the ML manager receives selection of a memory allocation. At block 420, the ML manager analyzes the training data set using machine learning (e.g., vector machine learning) to train the MLD profile. In one embodiment, the ML manager performs a write lock on the MLD profile during training. In one embodiment, training the MLD profile includes performing feature extraction (block 421), generating a classification model (block 422) and determining a quality of the classification model and feature set (block 423). At block 425, the ML manager displays the results of the analysis in the user interface. The results may include one or more quality metrics, such as a false positive rating, a false negative rating, a memory utilization rating, positive documents that failed extraction, and negative documents that failed extraction. In one embodiment the user can click on the failed extraction information to find out which documents failed extraction.

Figure 7:
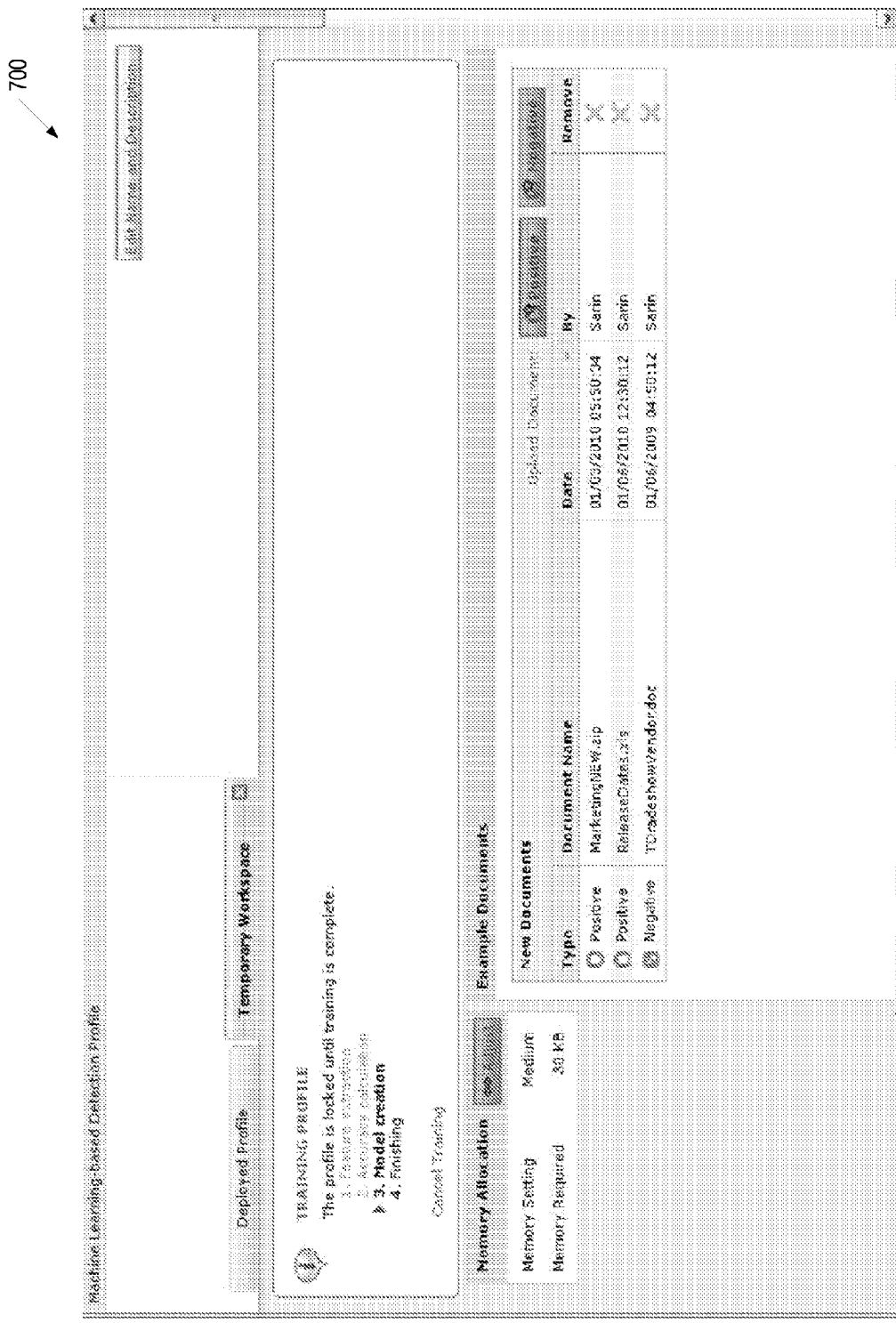

FIG. 7 illustrates a third view 700 of the user interface of FIG. 5 showing the MLD profile being trained. In one embodiment, the user interface shows each step of MLD profile training, including feature extraction, accuracy calculation, model creation and final processing. A current step of the MLD profile training may be highlighted to show where the ML manager is in MLD profile generation. In one embodiment, the temporary work space is locked while the profile is being trained. Additionally, the memory allocation may not be adjusted while the profile is being trained. This ensures that accurate training results are produced. In one embodiment, a user can select a cancel training option at any time during the training to halt training.

Figure 8:
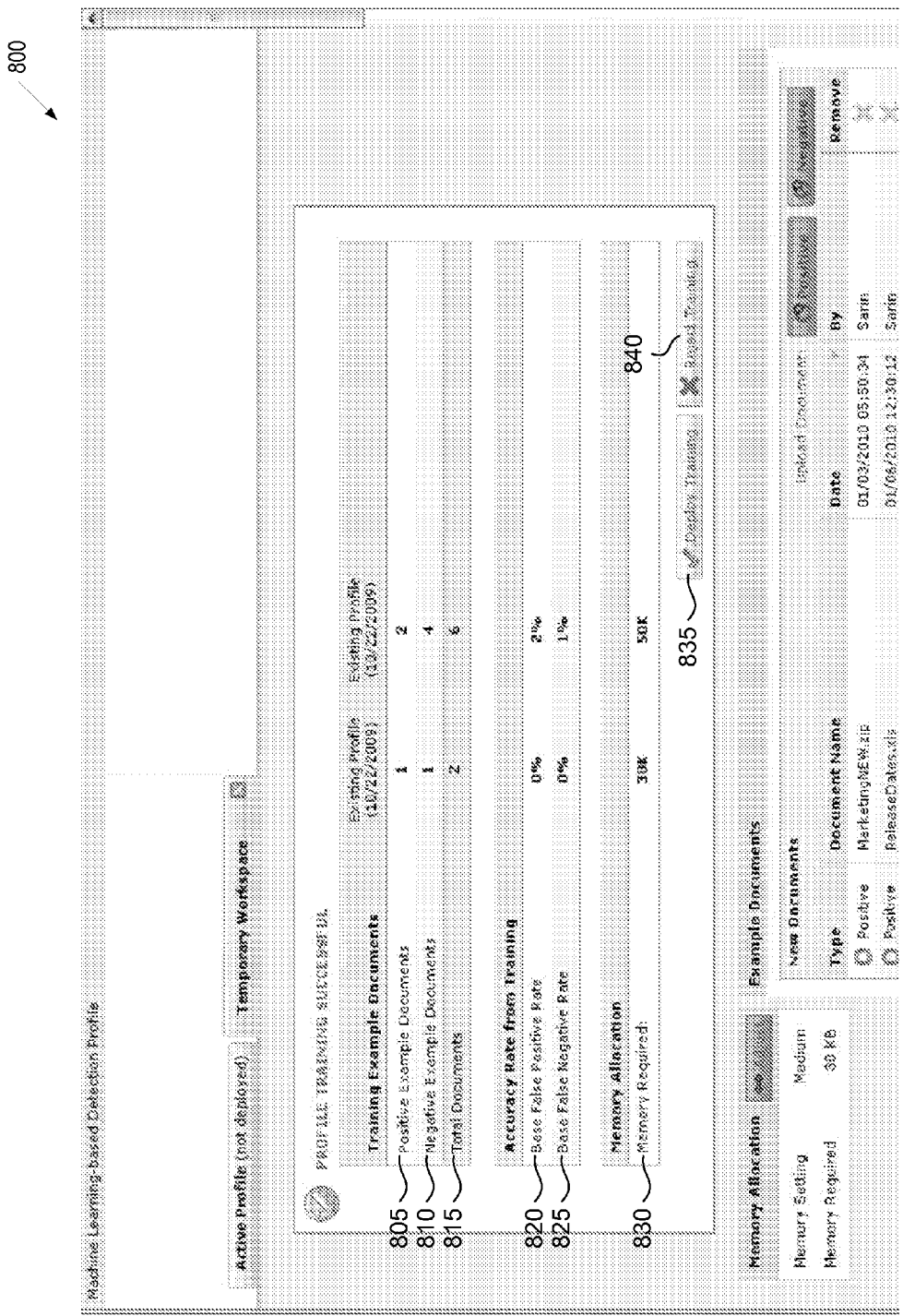

FIG. 8 illustrates a fourth view 800 of the user interface of FIG. 5 showing the MLD profile training results. In one embodiment, MLD profile results include positive documents count 805, a negative documents count 810 and a total documents count 815. In one embodiment, the ML manager displays a list of the features (e.g., words) in the feature set. The training results also include one or more quality metrics for the MLD profile. In one embodiment, the quality metrics include a false positive rating 820, a false negative rating 825 and a memory utilization rating 830. A user may select the false positive rating 820 to view additional false positive rating information, such as specific documents that caused false positives. Additionally, the user may select the false negative rating 825 to view additional false negative rating information, such as specific documents that caused false negatives. If the quality metrics are within quality thresholds, then a "deploy training" button 835 may be active. The user may select the "deploy training" button 835 to deploy the MLD profile. The user may also select a "reject training" button 840 to reject the MLD profile.

Returning to FIG. 4, at block 430, the ML manager determines whether the analysis results show that the MLD profile meets one or more deployment criteria. If the results meet the deployment criteria, then the method proceeds to block 435. Otherwise, the method continues to block 440.

At block 435, the ML manager enables a MLD profile deployment operation. At block 450, the ML manager receives a deploy command (e.g., based on a user pressing a deploy button in the user interface). If the MLD profile is associated with a policy, the deploy command results in deploying the profile to the detection servers. If the DLP policies are active DLP policies, then the MLD profile becomes active and may immediately be used to police documents. Note that if the MLD profile had a previously deployed version, that version remains deployed until a new version of that MLD profile is deployed. Deploying a newer version of an MLD profile may replace an older version.

At block 440, the ML manager suggests that the user make modifications to the training data set. If the user categorized the documents in the training data set, then the ML manager may identify a category of documents that should be added to the training data set. For example, if a particular category of document caused a large number of false positives, then the ML manager may suggest that the user add more documents of that category to the negative documents in the training data set.

At block 445, the ML manager determines whether any modifications were made to the training data set or to the memory allocation selection. If a change was made to the training data set or to the memory allocation, the method returns to block 420. Otherwise the method ends. The deployed profiles may be shown in a deployed Profile page. This page provides user with a view of the currently deployed profile.

Figure 9:
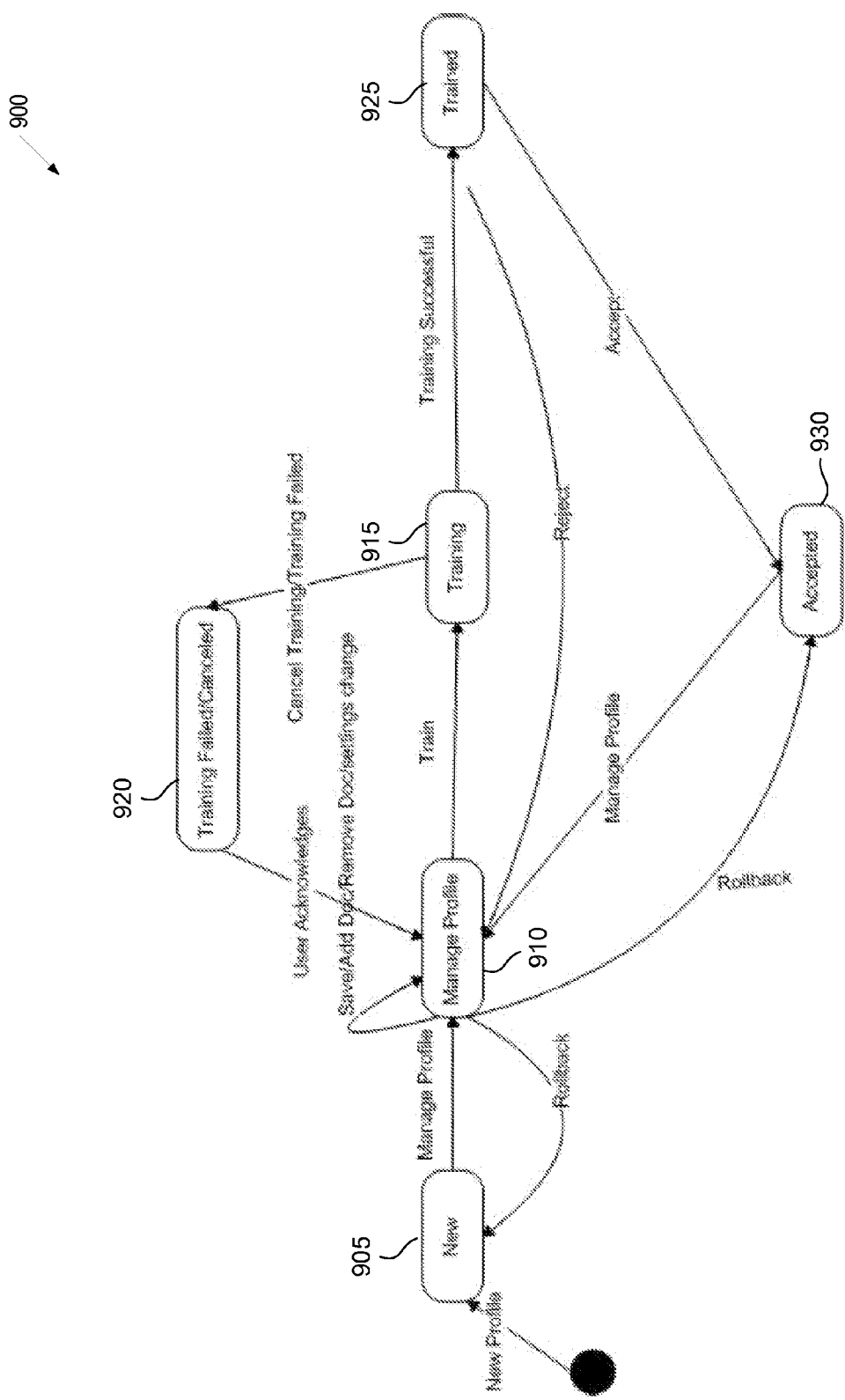
FIG. 9 is a state diagram showing different states of an ML manager during MLD profile generation, in accordance with one embodiment of the present invention.

FIG. 9 is a state diagram 900 showing different states of an ML manager during MLD profile generation/modification, in accordance with one embodiment of the present invention. When a user enters a command to generate a new MLD profile, the ML manager enters a "new" state 905, which causes the ML manager to generate a temporary workspace and an empty MLD profile. From the "new" state 905, the ML manager may enter a "manage profile" state 910. From the "manage profile" state 910, the ML manager can add documents to a training data set based on user input. The ML manager can also roll back the MLD profile to a previous condition and return to the "new" state 905 or proceed to a "training" state 915. If a previously generated MLD profile is being modified, the ML manager may also transition from the "manage profile" state 910 to an "accepted" state 930.

While in the "training" state 915, the ML manager trains the MLD profile. If the training is canceled or otherwise fails, the ML manager transitions to a "training failed/canceled" state 920. After user acknowledgement, the ML manger reverts to the "manage profile" state 910. If the training succeeds, the ML manager transitions to a "trained" state 925. A user may then reject the MLD profile, returning the ML manager to the "manage profile" state 910, or accept the MLD profile, transitioning the ML manager to the "accepted" state 930. From the "accepted" state, the ML manager may deploy the MLD profile.

Figure 10:
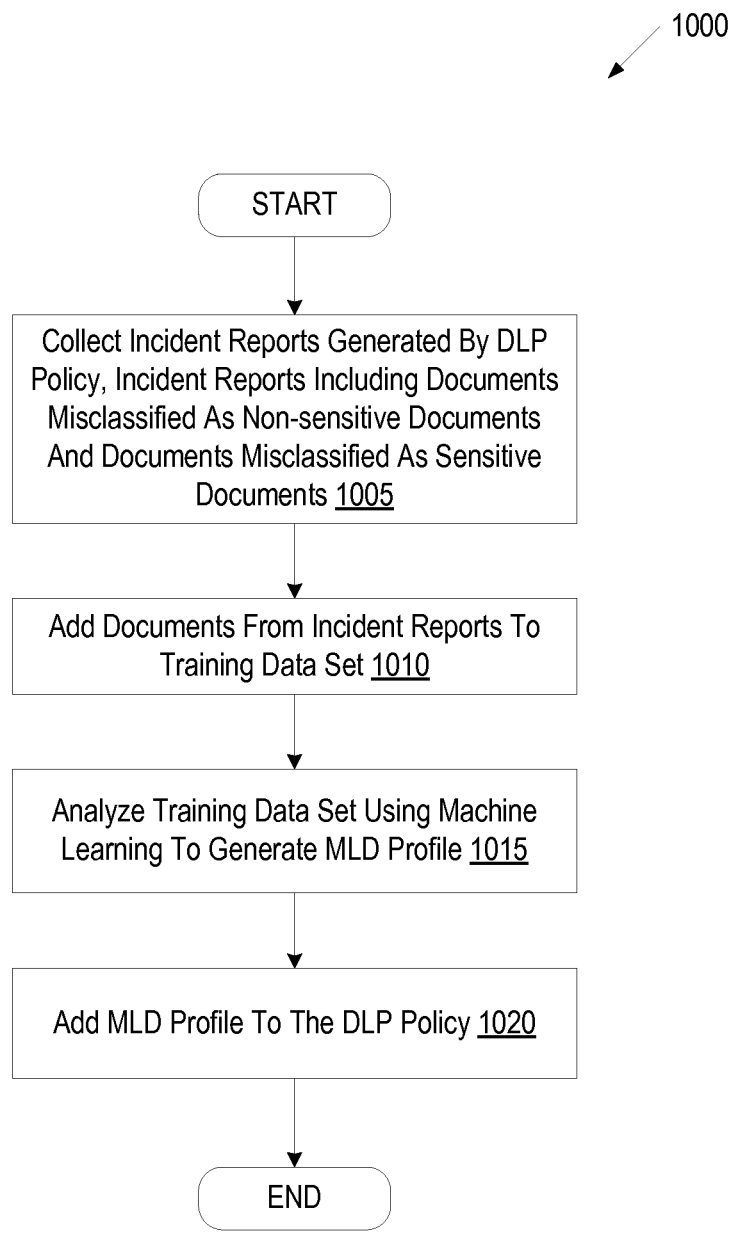
FIG. 10 is a flow diagram illustrating one embodiment for a method of generating a MLD profile and deploying the MLD profile to an existing DLP policy.

FIG. 10 is a flow diagram illustrating one embodiment for a method 1000 of generating a MLD profile and deploying the MLD profile to an existing DLP policy. Method 1000 is performed by processing logic that may comprise hardware (circuitry, dedicated logic, etc.), software (such as is run on a general purpose computer system or a dedicated machine), or a combination of both. Method 1000 may be performed by a ML manager such as ML manager 130 running on enforcement server 120 of FIG. 1.

Referring to FIG. 10, at block 1005 a ML manager collects incident reports and/or historical data generated by a DLP policy. The incident reports may include documents misclassified as non-sensitive documents and/or documents misclassified as sensitive documents. Additionally, the incident reports may include documents that were correctly classified as sensitive documents and/or documents that were correctly classified as non-sensitive documents.

At block 1010, the ML manager adds the documents from the incident reports/historical data to a training data set for a MLD profile. At block 1015, the ML manager analyzes the training data set using machine learning to train the MLD profile. This may include generating a feature set, generating a classification model and generating one or more quality metrics for the MLD profile. At block 1020, the ML manager adds the MLD profile to the DLP policy.

Method 1000 shows how incidents from an existing DLP policy may be used to generate a MLD profile. Therefore, a ML manager may perform method 1000 to improve an existing DLP policy to enable it to classify documents as sensitive or non-sensitive that it was previously unsuccessful at classifying.

Figure 11:
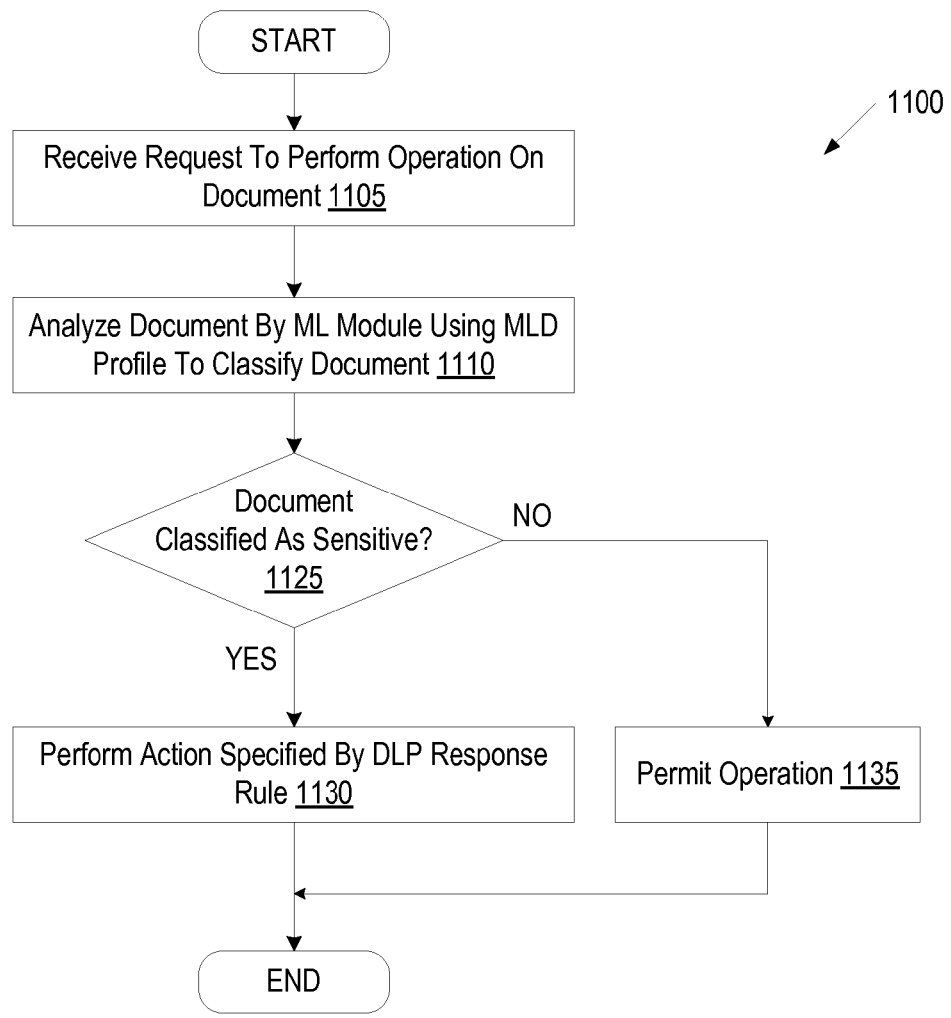
FIG. 11 is a flow diagram illustrating one embodiment for a method of protecting a computing device from data loss using a DLP policy that includes a MLD profile.

FIG. 11 is a flow diagram illustrating one embodiment for a method 1100 of protecting a computing device from data loss using a DLP policy that includes a MLD profile. The method 1100 is performed by processing logic that may comprise hardware (circuitry, dedicated logic, etc.), software (such as is run on a general purpose computer system or a dedicated machine), or a combination of both. Method 1100 may be performed by a DLP agent such as DLP agent 106 running on endpoint device 102A of FIG. 1. Method 1100 may also be performed by a global DLP detection engine such as global DLP detection engine 122 running on endpoint server 115 of FIG. 1.

Referring to FIG. 11, at block 1105 processing logic receives a request to perform an operation on a document. At block 1110, a ML module analyzes the document using a MLD profile to classify the document. At block 1125, processing logic determines whether the document was classified as sensitive or non-sensitive. If the document was classified as sensitive, the method continues to block 1130, and an action specified by a DLP response rule is performed, and an incident report is generated. This may include preventing the operation, generating an incident response report, etc. If the document was classified as non-sensitive, the method proceeds to block 1135, and the operation is performed.

Figure 12:
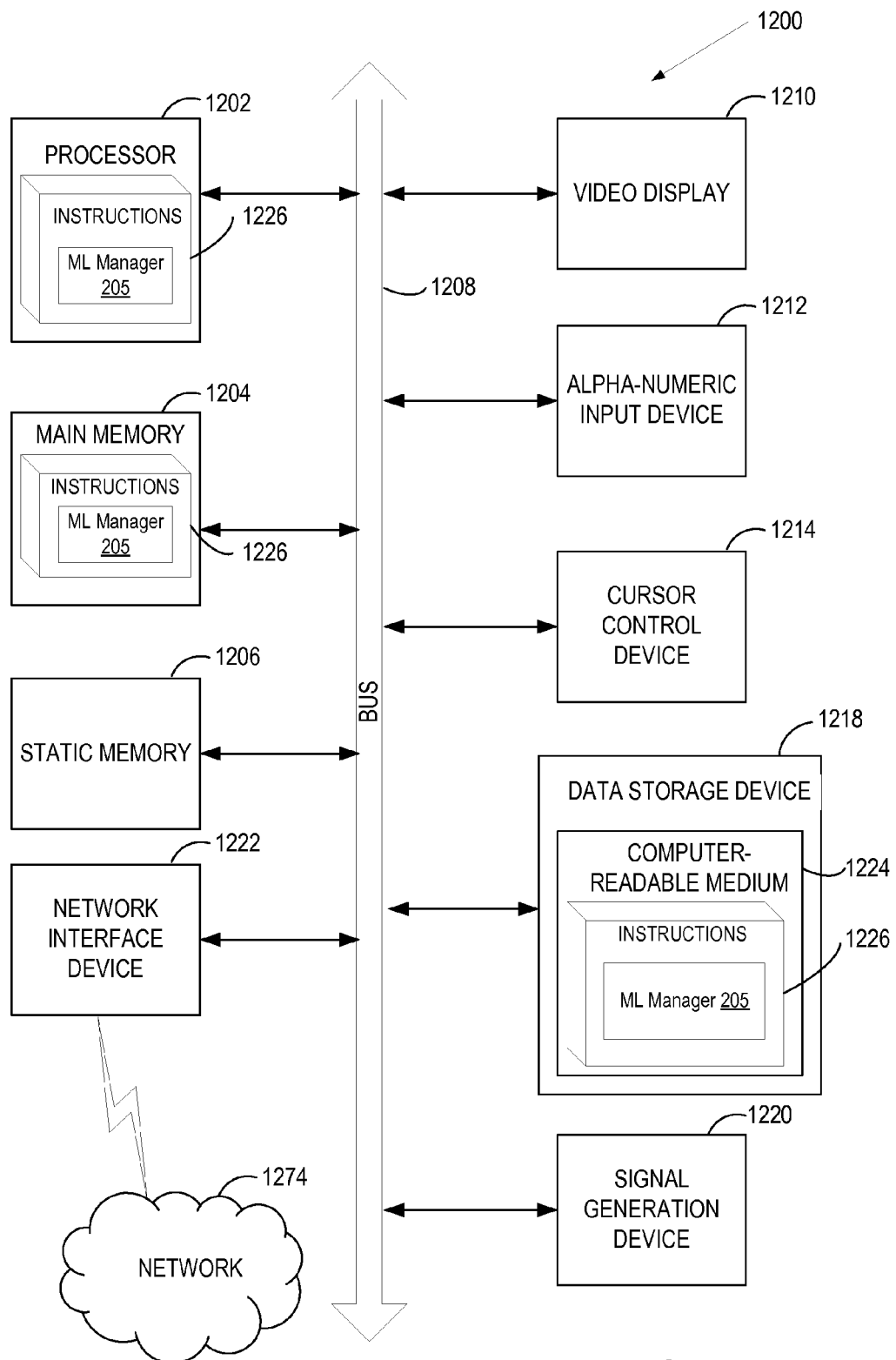
FIG. 12 is a block diagram of an exemplary computer system that may perform one or more of the operations described herein.

FIG. 12 illustrates a diagrammatic representation of a machine in the exemplary form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device (processor) 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1208.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1202 may also be one or more special-purpose processing devices such as an application specific integrated circuit (ASIC), a field programmable gate array (FPGA), a digital signal processor (DSP), network processor, or the like. The processor 1202 is configured to execute instructions 1226 for performing the operations and steps discussed herein.

The computer system 1200 may further include a network interface device 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker).

The data storage device 1218 may include a computer-readable storage medium 1224 on which is stored one or more sets of instructions 1226 (e.g., software) embodying any one or more of the methodologies or functions described herein. The instructions 1226 may also reside, completely or at least partially, within the main memory 1204 and/or within the processor 1202 during execution thereof by the computer system 1200, the main memory 1204 and the processor 1202 also constituting computer-readable storage media. The instructions 1226 may further be transmitted or received over a network 1274 via the network interface device 1222.

In one embodiment, the instructions 1226 include instructions for a ML manager, such as ML manager 205 of FIG. 2, and or a software library containing methods that call a ML manager. While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
receiving a training data set that includes a plurality of positive examples of sensitive data and a plurality of negative examples of sensitive data via a user interface;
analyzing the training data set using machine learning to train a machine learning-based detection (MLD) profile, the MLD profile to be used to classify new data as sensitive data or as non-sensitive data;
displaying a quality metric for the MLD profile in the user interface; and
if the quality metric fails to meet a quality threshold, performing the following comprising:
modifying the training data set in response to user input; and
analyzing the modified training data set to retain the MLD profile.

2. The method of claim 1, wherein analyzing the training data set comprises:
performing feature extraction on the training data set to generate a feature set that comprises features of the positive examples and features of the negative examples;
generating a classification model from the training data set; and
computing the quality metric, wherein the quality metric includes at least one of a false positive rating, a false negative rating or a memory utilization rating.

3. The method of claim 2, further comprising:
receiving a user selection of a memory allocation via the user interface before analyzing the training data set, wherein the memory utilization rating complies with the memory allocation.

4. The method of claim 2, further comprising:
enabling a deploy operation if the false positive rating is within a false positive threshold and the false negative rating is within a false negative threshold;
receiving a user request to perform the deploy operation via the user interface; and
in response to receiving the user request, adding the MLD profile to a data loss prevention (DLP) policy of a DLP system.

5. The method of claim 2, further comprising:
identifying in the user interface at least one of data that caused false positives and data that caused false negatives from the training data set.

6. The method of claim 1, further comprising:
receiving categorization information for the positive examples of sensitive data and for the negative examples of sensitive data; and
identifying in the user interface categories of data to add to the training data set to improve the quality metric.

7. The method of claim 1, further comprising:
displaying a new quality metric for the MLD profile in the user interface.

8. The method of claim 1, wherein the training data set was collected by a data loss prevention (DLP) policy of a DLP system, the plurality of negative examples of sensitive data comprising documents that were misclassified as sensitive documents by the DLP policy, the method further comprising:
deploying the MLD profile to the DLP policy.

9. The method of claim 1, further comprising:
receiving a selection of a sensitivity threshold via the user interface for the MLD profile; and
controlling a sensitivity threshold setting for the MLD profile based on the selection.

10. A non-transitory computer readable storage medium including instructions that, when executed by a processing device, cause the processing device to perform a method comprising:
receiving a training data set that includes a plurality of positive examples of sensitive data and a plurality of negative examples of sensitive data via a user interface;
analyzing the training data set using machine learning to train a machine learning- based detection (MLD) profile, the MLD profile to be used to classify new data as sensitive data or as non-sensitive data;
displaying a quality metric for the MLD profile in the user interface; and if the quality metric fails to meet a quality threshold, performing the following comprising:
  modifying the training data set in response to user input; and
  analyzing the modified training data set to retrain the MLD profile.

11. The non-transitory computer readable storage medium of claim 10, wherein analyzing the training data set comprises:
  performing feature extraction on the training data set to generate a feature set that comprises features of the positive examples and features of the negative examples;
  generating a classification model from the training data set; and
  computing the quality metric, wherein the quality metric includes at least one of a false positive rating, a false negative rating or a memory utilization rating.

12. The non-transitory computer readable storage medium of claim 11, the method further comprising:
  receiving a user selection of a memory allocation via the user interface before analyzing the training data set, wherein the memory utilization rating complies with the memory allocation.

13. The non-transitory computer readable storage medium of claim 11, the method further comprising:
  enabling a deploy operation if the false positive rating is within a false positive threshold and the false negative rating is within a false negative threshold;
  receiving a user request to perform the deploy operation via the user interface; and
  in response to receiving the user request, adding the MLD profile to a data loss prevention (DLP) policy of a DLP system.

14. The non-transitory computer readable storage medium of claim 11, the method further comprising:
  identifying in the user interface at least one of data that caused false positives and data that caused false negatives from the training data set.

15. The non-transitory computer readable storage medium of claim 10, the method further comprising:
  receiving categorization information for the positive examples of sensitive data and for the negative examples of sensitive data; and
  identifying in the user interface categories of data to add to the training data set to improve the quality metric.

16. The non-transitory computer readable storage medium of claim 10, the method further comprising:
  displaying a new quality metric for the MLD profile in the user interface.

17. The non-transitory computer readable storage medium of claim 10, wherein the training data set was collected by a data loss prevention (DLP) policy of a DLP system, the plurality of negative examples of sensitive data comprising documents that were misclassified as sensitive documents by the DLP policy, the method further comprising:
  deploying the MLD profile to the DLP policy.

18. The non-transitory computer readable storage medium of claim 10, the method further comprising:
  receiving a selection of a sensitivity threshold via the user interface for the MLD profile; and
  controlling a sensitivity threshold setting for the MLD profile based on the selection.

19. A computing device comprising:
  a memory to store instructions for a machine learning manager; and
  a processing device to execute the instructions, wherein the instructions cause the processing device to:
    provide a user interface for the machine learning manager;
    receive a training data set that includes a plurality of positive examples of sensitive data and a plurality of negative examples of sensitive data via the user interface;
    analyze the training data set using machine learning to train a machine learning-based detection (MLD) profile to be used to classify new data as sensitive data or as non-sensitive data;
    display a quality metric for the MLD profile in the user interface; and
    if the quality metric fails to meet a quality threshold, performing the following comprising:
      modify the training data set in response to user input; and
      analyze the modified training data set to retrain the MLD profile.

20. The computing device of claim 19, wherein analyzing the training data set comprises:
  performing feature extraction on the training data set to generate a feature set that comprises features of the positive examples and features of the negative examples;
  generating a classification model from the training data set; and
  computing the quality metric, wherein the quality metric includes at least one of a false positive rating, a false negative rating or a memory utilization rating.

21. The computing device of claim 20, further comprising the instructions to cause the processing device to:
  identify in the user interface at least one of data that caused false positives and data that caused false negatives from the training data set.

22. The computing device of claim 19, wherein the training data set was collected by a data loss prevention (DLP) policy of a DLP system, the plurality of negative examples of sensitive data comprising documents that were misclassified as sensitive documents by the DLP policy, further comprising the instructions to cause the processing device to:
  deploy the MLD profile to the DLP policy.

23. The computing device of claim 19, further comprising the instructions to cause the processing device to:
  receive a selection of a sensitivity threshold via the user interface for the MLD profile; and
  control a sensitivity threshold setting for the MLD profile based on the selection.

* * * * *